United States Patent [19]
Perrin

[11] 3,867,719
[45] Feb. 18, 1975

[54] RELATIVE MOVEMENT RESPONSIVE SIREN ALERT

[76] Inventor: John W. Perrin, 3805 Harness Ln., Camp Hill, Pa. 17011

[22] Filed: Mar. 24, 1972

[21] Appl. No.: 237,642

[52] U.S. Cl. ................................................. 340/33
[51] Int. Cl. ............................................. G08g 1/09
[58] Field of Search ........ 340/34, 33, 32, 15; 343/8; 179/1 VE

[56] References Cited
UNITED STATES PATENTS

| | | | |
|---|---|---|---|
| 3,182,288 | 5/1965 | Smith | 340/34 |
| 3,412,378 | 11/1968 | Thomas | 340/34 |
| 3,445,807 | 5/1969 | Hirschberg et al. | 340/15 |
| 3,568,144 | 3/1968 | Streb | 340/34 |
| 3,626,413 | 12/1971 | Zachmann | 343/8 |

*Primary Examiner*—Kathleen H. Claffy
*Assistant Examiner*—Douglas W. Olms
*Attorney, Agent, or Firm*—Fulwider, Patton, Rieber, Lee & Utecht

[57] ABSTRACT

A relative movement responsive siren alert including transducer means tuned to approximately 500 CPS, for mounting exteriorly of a surface vehicle and responsive to an audio signal from a siren to produce a fluctuating electrical signal. Amplifier means is connected with the transducer means for amplifying the electrical signal to produce an amplified signal. Frequency shift responsive means is connected with the amplifier means and is operative in response to frequency shift in one direction of the amplified signal to produce a first alert signal and to frequency shift in the direction opposite the one direction to produce a second alert signal. An alarm, such as an indicator light, is connected with the frequency responsive means and is responsive to the first and second signal to produce respective first and second frequencies of light fluctuation so the dirver of the vehicle can readily observe the indicator light to determine whether or not the siren source is moving towards or away from the subject vehicle.

8 Claims, 1 Drawing Figure

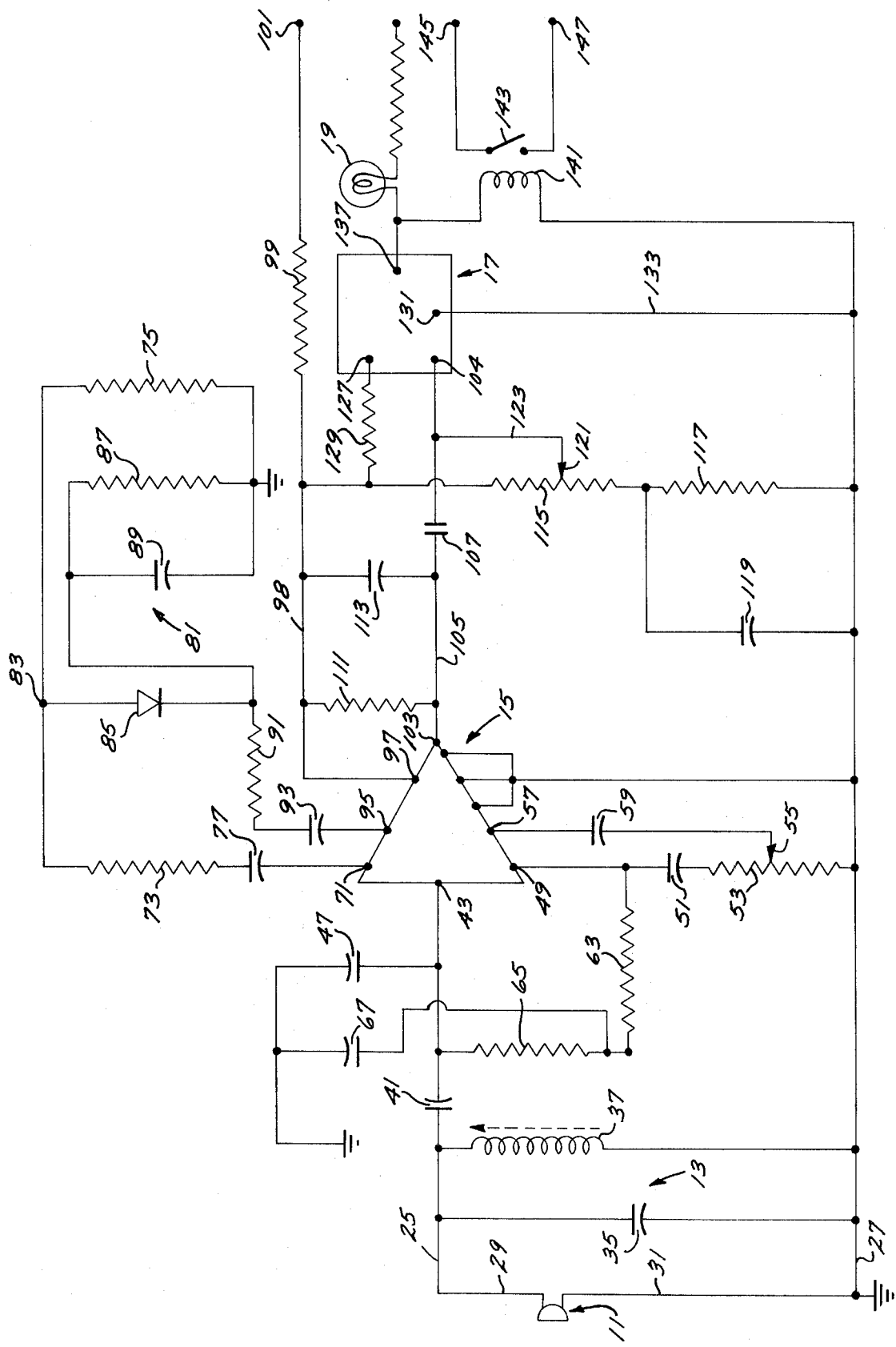

3,867,719

RELATIVE MOVEMENT RESPONSIVE SIREN ALERT

BACKGROUND OF THE INVENTION

1. Field of the Invention

The present invention relates to a siren alert for use in a sound repressive vehicle, such as an automobile, for giving an interior indication of whether or not the vehicle is moving toward or away from the source of the siren.

2. Description of the Prior Art

Siren alerts have been proposed which include exterior microphones that actuate interior indicator lights and the like. Devices of the general type are shown in the following U.S. Patents:

| | |
|---|---|
| 3,430,195 | Castlen, R. C. |
| 3,014,199 | Dill, L. G. et al. |
| 3,182,288 | Smith, H. G. |
| 3,412,378 | Thomas, J. R. |

Also, projectile detecting devices have been proposed for indicating whether a projectile is closing in on or departing from the system. A device of this type is shown in the U.S. Pat. No. 3,445,807 to Hirschberg.

SUMMARY OF THE INVENTION

The siren alert of the present invention is characterized by a transducer means tuned to the frequency of conventional sirens to drive amplifier means which provides an input to a frequency shift responsive circuit. The frequency shift responsive circuit responds to variations in frequency modulation of the input signal to actuate an alarm device that indicates whether the source of the siren is closing in on or departing from the transducer.

The object and advantages of the present invention will become apparent from a consideration of the following detailed description when taken in conjunction with the following accompanying drawing.

DESCRIPTION OF THE DRAWINGS

The single FIGURE shown in the drawing is a schematic view of a relative movement responsive siren alert embodying the present invention.

DESCRIPTION OF THE PREFERRED EMBODIMENT

The siren alert of the present invention includes, generally, a crystal microphone 11 connected with a tuning circuit 13 which is tuned to resonate at approximately 500 cycles per second, it being realized that 500 C. P. S. corresponds with the frequency of normal siren sound waves. The output from the tuning circuit 13 is connected with three stage integrated circuit (I/C) 15 including a demodulating circuit 81 that amplifies and demodulates the electric signal applied thereto and drives a frequency and amplitude responsive integrated circuit 17 in response to the demodulated output thereof. The output of the frequency responsive circuit 17 is connected with an indicator light 19 and is operative in response to the demodulated frequency shifts to increase or decrease the frequency and fluctuation of the intensity of such light depending on whether such shifts are to higher or lower frequencies to thereby take advantage of the Doppler effect resulting from the closing of or increasing of the distance between the microphone 11 and the source of a siren to indicate whether the subject vehicle and source of the siren noise are drawing closer together or traveling apart.

The transducer, or microphone, 11 is connected between positive and negative leads 25 and 27 by means of a pair of leads 29 and 31. Also connected between the leads 25 and 27 is the tuning network consisting of parallel connected capacitor 35 and inductance coil 37.

A coupling capacitor 41 is connected between the output from the tuning circuit 13 and the input terminal 43 of the three stage I/C 15. The integrated circuit 15 is preferable RCA's model No. CA-3035. The input terminal 43 of such circuit 17 is connected to ground through a capacitor 47 which cooperates with the capacitor 41 to form an audio voltage divider coupling arrangement.

The first stage output terminal 49 of the I/C 15 is connected with the negative lead 27 by means of a series connected coupling capacitor 51 and sensitivity adjustment resistor 53. The wiper 55 of the adjustable resistor 53 is connected with the second stage input terminal 57 by means of a coupling capacitor 59.

Connected between the first stage input and output terminals 43 and 49 is a feed back loop formed by resistors 63 and 65, the juncture between such resistors being connected with ground by means of audio voltage dividing capacitor 67.

The second stage output terminal 71 is connected to ground by means of a pair of series connected voltage divider resistors 73 and 75 and a coupling capacitor 77. A demodulator and filtering circuit, generally designated 81, is connected to the juncture 83 formed between the resistors 73 and 75 by means of a detector diode 85. The demodulator-filtering circuit 81 includes a regeneration network formed by a parallel connected resistor 87 and capacitor 89 which are connected on one end with the detector diode 85 and on the opposite end with ground. The remainder of the filtering portion of the circuit 81 is formed by a network including series connected resistor 91 and capacitor 93, and leading to the input terminal 95 of the third stage of the integrated circuit 15. The integrated circuit 17 is in the form of a Schmitt trigger and is preferably Amperex's model No. TAA-560.

The positive terminal 97 of the I/C 15 is connected through a triggering circuit resistor 99 to positive terminal 101 which may be connected with a 6 volt source. The output terminal 103 of such I/C 15 is connected with the phase detector circuit 17 by means of a lead 105 including a coupling capacitor 107. A parallel connected voltage drop resistor 111 and bypass capacitor 113 are connected between the positive lead 98 and the I/C output lead 105.

A triggering circuit is connected between the positive lead 98 and negative lead 27 and is formed by an adjustable resistor 115 connected in series with a parallel connected circuit consisting of resistor 117 and filtering capacitor 119. The wiper 121 of the adjustable resistor 115 is connected with the input terminal 104 of the Schmitt trigger 17 by means of a lead 123 to thereby enable the signal to such trigger to be adjusted.

The positive terminal 127 of the Schmitt trigger 17 is connected with the positive lead 98 by means of a voltage drop resistor 129. The ground terminal 131 of such Schmitt trigger is connected with the negative lead 27 by means of a lead 133. The output terminal 137 of the Schmitt trigger 17 is connected with the alarm light 19 and also with an electro magnetic coil 141 which controls a switch 143 leading to terminals 145 and 147, which terminal may be connected with an audio alarm located within the confines of the vehicle.

In operation the microphone 11 is mounted exteriorly of the vehicle in which the siren alarm of present invention is to be utilized and the indicator light 19 mounted in the driver's field of vision, as for example, on the instrument panel or in the central area between the sun-visors. Also, if an audio alarm is connected with the terminals 145 and 147, such alarm is also mounted interiorly in the vehicle.

When such vehicle is operated on the city streets or freeway, any time siren emitting sound waves on the order of 500 CPS is actuated in the area, it is likely that there will be relative movement between such siren and the subject vehicle. In such cases, the well known Doppler principle dictates that the sound waves reaching the microphone 11 will be of varying frequency which when demodulated results in altering the current flow in the indicator light 19 to indicate whether the siren is approaching the subject vehicle or departing therefrom.

The microphone 11 converts the sound wave to electrical impulses having a frequency of approximately 500 CPS and the tank circuit 13 is operative to resonate at such frequencies to apply the resultant electrical signal through the coupling capacitor 41 to the input terminal 43 of the first stage of the 1/C 15. Such electrical signal is amplified by the first stage of the 1/C 15 and communicated to the first stage output terminal 49, from where it is through the stabilization and feedback circuit formed by the resistors 63 and 65 and capacitor 67 to obtain the appropriate bypass and feedback for the desired gain and bandwidth of such first stage. The electrical signal from terminal 49 is coupled through capacitor 51 and sensitivity adjustable resistor 53 to ground and the wiper 55 picks off an intermediate signal and directs it through coupling capacitor 59 to the input terminal 57 of the second stage of the integrated circuit 15. The second stage of such integrated circuit further amplifies the electrical signal and applies the amplified signal to second stage output terminal 71. The signal from the second stage output terminal is fed to ground through voltage divider resistors 73 and 75 and the intermediate signal is directed through the detector diode 85 to form a half wave pulsating D. C. current for imposition on the filtering circuit 81. The half wave pulsating D. C. current is then fed to the input terminal 95 of the third stage of the 1/C 15 where such signal is further amplified and imposed on the input terminal 104 of the Schmitt trigger 17 by means of the coupling capacitor 107. The Schmitt trigger 17 provides a three stage amplification to impose a 50 milliampere current on the indicator light 19 to energize such light.

As one skilled in the art will appreciate, any frequency mismatch, which could be intentionally imposed or which exists through various tolerances, between the demodulator and the siren source will produce a given demodulated base frequency. Thus if the siren and subject vehicle are closing in on one another to Doppler effect of the sound wave on the microphone 11 results in increasing the frequency of sound wave and, consequently, the frequency of the demodulated signal imposed on the Schmitt trigger 17 to, correspondingly, increase the frequency of the output current which energizes light 19 to thereby cause the intensity of such light to fluctuate at a greater frequency. Further, if the siren and subject vehicle are drawing further apart, the frequency of the sound wave imposed on the microphone 11 will be decreased thereby decreasing the frequency of the current imposed on the Schmitt trigger 17 and consequently the rate of current fluctuation to the indicator light 19 to thereby decrease the frequency at which such light fluctuates in intensity to signify drawing apart of the siren and subject vehicle.

When the current rate exceeds a predetermined amount the magnetic field around the solenoid 141 will be increased sufficiently to close the switch 143 and energize the terminals 145 and 147 to actuate any audio alert connected therewith. Also, when the current from the Schmitt trigger 17 drops below a predetermined level, the switch 143 will be opened to indicate that the siren and subject vehicle are drawing further away from one another.

From the foregoing it will be apparent that the siren alert of the present invention provides a convenient and economical means for alerting a driver of the fact that an emergency vehicle is in the immediate area with its siren operating and of whether or not such emergency vehicle is drawing closer or further away from the subject vehicle.

Various modifications and changes may be made with regard to the foregoing detail description without departing from the spirit of the invention

I claim:

1. A relative movement responsive siren alert for use with a surface vehicle and comprising:
    transducer means for mounting exteriorly of said vehicle and operative in response to an audio signal from a siren to produce an electrical signal;
    amplifier means connected with said transducer means including demodulating means for amplifying and demodulating said electrical signal to produce an amplified demodulated signal;
    frequency responsive means connected with said amplifier means and operative in response to frequency shift in one direction of said amplified signal to produce a first alert signal and to frequency shift in the direction opposite said one direction to produce a second alert signal;
    alarm means connected with said frequency responsive means and responsive to said first alert signal to produce a first alarm signal detectable by human senses and to said second alert signal to produce a second alarm signal detectable by human senses, whereby convergence of said siren and said vehicle will produce a first Doppler, effect detectable to said transducer to cause a first frequency shift of said amplified signal in said one direction said first frequency shift being demodulated to actuate said alarm means to produce said first alarm signal while divergence of said vehicle and siren will produce a second Doppler effect to cause a second frequency shift of said amplified signal in said direction opposite said one direction said second frequency being demodulated to actuate said alarm means to produce said second alarm signal.

2. A relative movement responsive siren alert as set forth in claim 1 wherein:
    said frequency responsive means further includes Schmitt trigger means.

3. A relative movement responsive siren alert as set forth in claim 1 that includes:

variable resistor means connected with said amplifier means for adjusting the sensitivity thereof.

4. A relative movement responsive siren alert as set forth in claim 1 wherein:
said transducer means includes a resonating tuning circuit for tuning said transducer to a predetermined frequency.

5. A relative movement responsive siren alert as set forth in claim 1 wherein:
said amplifier means includes a three stage integrated circuit having a demodulator interposed in series between the second and third stages thereof, and said alarm means includes:
an adjustable resistor connected with said integrated circuit for adjusting the sensitivity thereof.

6. A relative movement responsive siren alert as set forth in claim 1 wherein:
said alarm means includes alarm light means responsive to said first and second alarm signals to be energized according to the beat frequency of the demodulated signal.

7. A relative movement responsive siren alert as set forth in claim 1 wherein:
said frequency means is operative in response to the demodulating means output signal providing a signal indicative of phase shifts to develop continuously varying output signals in response thereto.

8. A relative movement responsive siren alert as set forth in claim 1 wherein:
said demodulating means being connected in circuit with said amplifier means to demodulate said amplified signal.

* * * * *